United States Patent
Rinklin

(10) Patent No.: US 7,032,702 B2
(45) Date of Patent: Apr. 25, 2006

(54) REAR COVERING PART WITH A TAIL PIPE ORIFICE

(75) Inventor: Gerhard Rinklin, Tiefenbronn (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 19 days.

(21) Appl. No.: 10/731,444

(22) Filed: Dec. 10, 2003

(65) Prior Publication Data

US 2004/0163874 A1    Aug. 26, 2004

(30) Foreign Application Priority Data

Dec. 13, 2002 (DE) .................. 102 58 250

(51) Int. Cl.
*B60K 13/04* (2006.01)

(52) U.S. Cl. ................ 180/309; 181/227; 181/228
(58) Field of Classification Search ................ 180/309, 180/311, 312; 181/227, 228, 224, 245, 251, 181/253, 254, 246, 446

See application file for complete search history.

(56) References Cited

U.S. PATENT DOCUMENTS

| | | | |
|---|---|---|---|
| 2,308,607 A * | 1/1943 | Jackson | 180/311 |
| 2,860,314 A | 9/1958 | Haigh et al. | 293/69 |
| 4,589,515 A * | 5/1986 | Omura | 181/227 |
| 5,173,576 A * | 12/1992 | Feuling | 181/255 |
| 5,466,900 A * | 11/1995 | Knapp | 181/227 |
| 5,967,108 A * | 10/1999 | Kutlucinar | 123/190.6 |
| 6,220,387 B1 * | 4/2001 | Hoppes et al. | 181/227 |
| 6,336,471 B1 * | 1/2002 | Feuling | 181/227 |
| 6,491,418 B1 * | 12/2002 | Chen | 181/227 |
| 6,595,318 B1 * | 7/2003 | Ebinger et al. | 181/227 |
| 6,810,992 B1 * | 11/2004 | Lombardo | 181/227 |

FOREIGN PATENT DOCUMENTS

DE    100 25 121 A1    12/2001

* cited by examiner

*Primary Examiner*—Hau Phan
(74) *Attorney, Agent, or Firm*—Crowell & Moring LLP

(57) ABSTRACT

A rear covering part fastened to a tail pipe orifice for a motor vehicle exhaust system. The rear covering part includes a completely bordered passage opening through which the tail pipe orifice penetrates. The rear covering part avoids damage to the exhaust system in the event of an accident-caused deformation. The passage cross-section of the tail pipe orifice (7, 7'), over its entire length (LG), is larger than the exterior cross-section (W3) of the tail pipe (3) of the exhaust system.

17 Claims, 2 Drawing Sheets

REAR COVERING PART WITH A TAIL PIPE ORIFICE

BACKGROUND AND SUMMARY OF THE INVENTION

This application claims the priority of Application No. 102 58 250.2, filed 13 Dec. 2002, in Germany, the disclosure of which is expressly incorporated by reference therein.

The invention is based on a rear covering part with a tail pipe orifice fastened thereto, for an exhaust system of a motor vehicle, having a bordered passage opening for the tail pipe orifice.

A rear covering part of the above-mentioned type is known from U.S. Patent Document U.S. Pat. No. 2,850,314. It is constructed as a bumper to which a tail pipe orifice is fastened which—viewed in the flow direction of the exhaust gases—first narrows in a transition section and then expands in a fan-shaped manner in an outlet section. The outlet opening of the tail pipe orifice is situated in a passage bore which is provided in the rear covering part. The tail pipe orifice has an inlet opening which communicates with a tail pipe of the exhaust system. The outlet opening is arranged downstream of the inlet opening. The transition section, which is tapered in its cross-section, is arranged in-between. In order to guide cooling air flow through the tail pipe orifice while driving the vehicle, the interior cross-section of the inlet opening is larger than the exterior cross system of the tail pipe of the exhaust system, and the air inlet section of the tail pipe orifice having the inlet opening reaches over the tail pipe and is situated at a radial distance from the tail pipe. Only a connection to the rear covering part is provided for the fastening of the tail pipe. Thus, a heat transmission from the tail pipe of the exhaust system to the tail pipe orifice can take place only by the hot exhaust gas because no contact exists between the tail pipe and the orifice, and a heat conducting connection of materials between the tail pipe orifice and the tail pipe is therefore avoided.

German Patent Document DE 100 25 121 A1 discloses a tail pipe orifice which is pushed onto a tail pipe of an exhaust system. The tail pipe orifice is connected only with the tail pipe, whereby a heat conduction exists from the heated tail pipe to the orifice. This orifice is therefore not suitable for fastening to rear covering parts, particularly when they are made of a plastic material and/or painted and/or coated.

It is therefore an object of the invention to provide a rear covering part with a tail pipe orifice which takes into account safety-related and visual aspects as well as styling and also prevents an excessive heating of the tail pipe orifice.

The principal advantages achieved by means of the invention are, in addition to an attractive appearance, that, in the event of a vehicle accident causing deformations on the rear covering part, the exhaust system with the tail pipe is protected to a certain extent from damage. This protection results from the tail pipe orifice, because of its correspondingly designed passage cross-section, being able to be pushed, for the most part over the tail pipe and, in the process, not significantly damaging the tail pipe. This particular fastening of the orifice and its extending through the rear covering part reduces the risk of leakage at the exhaust system. In addition, as a result of the corresponding passage cross-section, sufficient air is guided through the orifice during driving of the vehicle in order to keep this air at a low temperature or prevent an excessive convection, so that the gap between the orifice and the rear covering part can be optimized.

An improved cooling of the tail pipe orifice in the driving operation of the vehicle is achieved by means of a double-walled pipe for the orifice. Air is able to flow through the hollow jacket of this double-walled pipe, whereby, because of the thus achieved interior cooling air flow, the exterior pipe wall of the double-walled pipe is heat-insulated from the interior pipe wall along which the flow of the hot exhaust gases takes place.

It is a further object of the invention to provide fastening lugs which can be mounted on the exterior pipe wall of the orifice. These fastening lugs are connected with the rear covering part optionally by way of a fastening frame and are constructed in a strip shape, so that a punctiform linkage of the orifice to the rear covering part is achieved and little heat is transmitted to the rear covering part. For example, three fastening lugs may be used.

In a further development, in addition to the interior air flow through the hollow jacket around the tail pipe orifice, another, exterior cooling air flow can be guided past, which exits between the rear covering part and the tail pipe orifice, so that the exterior pipe wall of the tail pipe orifice is also cooled from the outside by the air which passes. Furthermore, the fastening lugs for the tail pipe orifice are situated in this exterior air flow, to provide cooling of these fastening lugs.

According to an another embodiment, the air outlet opening for the exterior air flow constructed between the tail pipe orifice and the rear covering part, for example, for appearance purposes, is advantageously equipped with a covering which may be provided with perforations.

A further preferred embodiment has the tail pipe orifice constructed as a double tail pipe orifice, in which case the two pipes may be fastened to one another and be disposed side-by-side or above one another.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
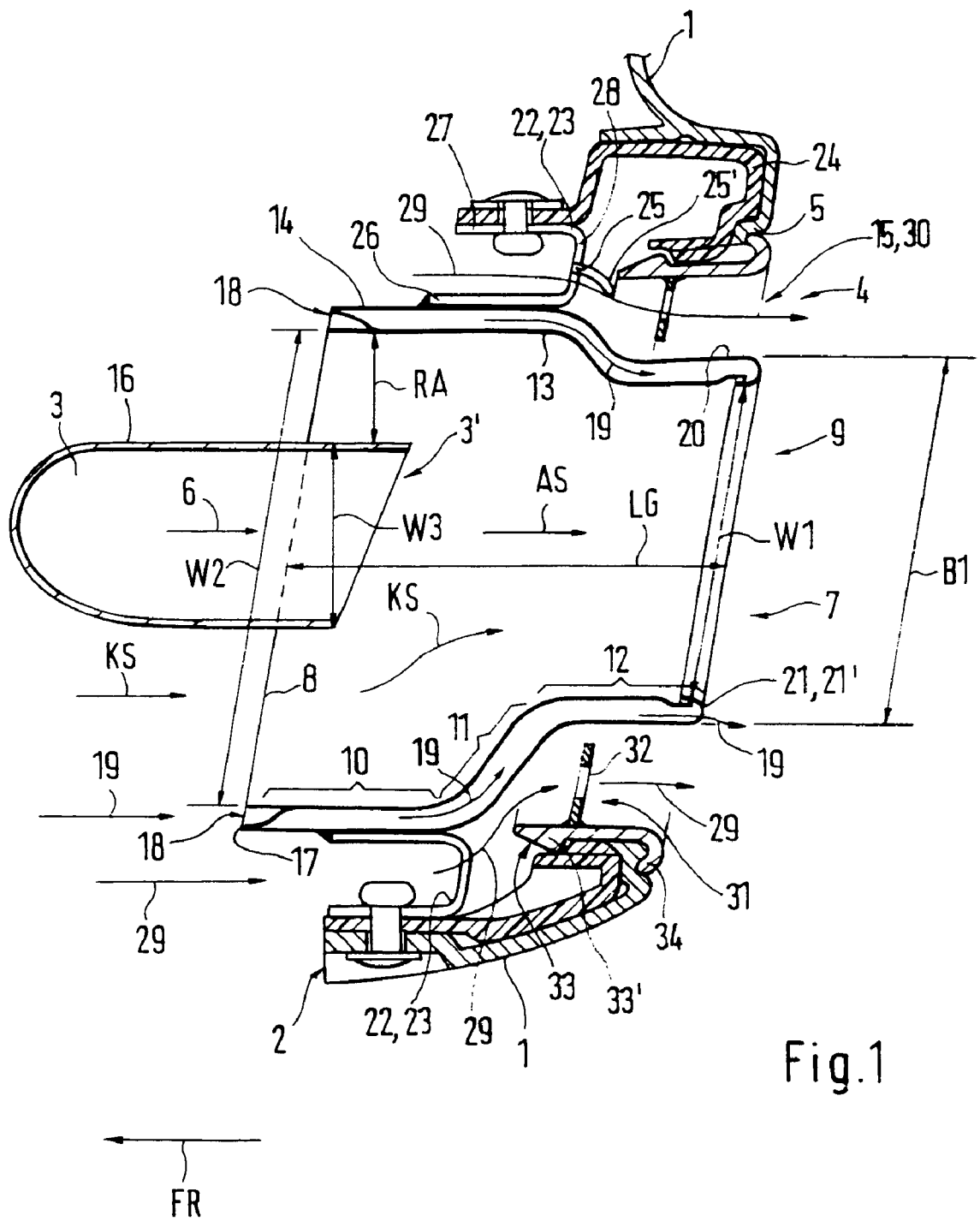
FIG. 1 is a sectional views of a rear covering part to which a tail pipe orifice, is fastened with the sectional plane extending parallel to an imaginary vertical line.

FIG. 1 shows a cutout of a rear covering part 1 of a motor vehicle having an internal-combustion engine. The rear covering part forms the rearward end of the vehicle body and, in particular, covers a bumper cross member which is not shown here. The upper end of the rear covering part 1, which is not shown here, adjoins the remaining outer skin of the body of the motor vehicle. The lower free end 2 of the rear covering part 1 is situated, for example, adjacent to the vehicle floor or on the underside of the vehicle. The second end 2 may optionally also change into an underbody covering (not shown here) or be connected therewith.

The motor vehicle is preferably a sports car, in the case of which the internal-combustion engine is used in a rear engine or mid-engine arrangement. Particularly with respect to these vehicles, there exists the problem that the exhaust system—of which only a tail pipe 3 is shown here—has to work with a short pipe layout between the exhaust gas manifold and the tail pipe 3, whereby the exhaust gases of the internal-combustion engine exiting at the tail pipe 3 are caused to still have a very high temperature, particularly in comparison with exhaust systems which, because of the arrangement of the internal-combustion engine in the forward area, have a correspondingly long pipe layout into the rearward area. However, the object described in the following is not limited to sports cars with a rear engine or mid-engine but can be used in the same manner for other passenger cars, optionally also with a front engine.

For example, for reasons of styling and/or aerodynamic requirements, there is the desire to not extend the tail pipe 3 below the rear covering part 1 but, if possible, through the rear covering part 1. For this purpose, a passage opening 4 is provided in the rear covering part 1, which passage opening 4 is completely surrounded by a mouth edge 5. So that the hot exhaust gases flowing in the direction of the arrow 6 in the tail pipe 3 can be guided out of the passage opening 4 without in the process damaging the rear covering part 1, which preferably consists of a plastic material, as a result of the heat effect, a tail pipe orifice 7 according to the first embodiment of FIG. 1 is provided, which tail pipe orifice 7 is assigned to the tail pipe 3 and is thermally uncoupled from the tail pipe 3. This orifice is implemented as a single-pipe orifice, in which case embodiments for several tail pipes 3 can be provided so that one tail pipe orifice 7 can be assigned to each tail pipe 3. Several orifices can form a cohesive construction unit, which will be discussed below in connection with FIG. 2.

The orifice 7 has an inlet opening 8 and communicates with the exhaust gas outlet 3' at the tail pipe 3 of the exhaust system. In addition, the tail pipe orifice 7 has an outlet opening 9 which—viewed in the downstream direction (direction of the arrow 6) of the exhaust gas flow AS—is arranged behind the inlet opening 8. In particular, the outlet opening 9 is situated outside the rear covering part 1 or projects beyond it, so that the tail pipe orifice 7 penetrates the rear covering part 1 or penetrates the passage opening 4. However, it is also possible to let the outlet opening 9 end in the plane of the mouth edge 5 or shortly in front of it. The tail pipe orifice 7 has several successively arranged sections 10, 11 and 12, of which an air inlet section 10 has the inlet opening 8. In the downward direction (arrow 6), the air inlet section 10 is adjoined by a transition section 11 which has a tapering cross-section and which changes into an outlet section 12 having the outlet opening 9, so that the transition section 11 is arranged between the inlet opening 8 and the outlet opening 9. The exterior orifice cross-section B1 in the area of the outlet opening 9 and thus also the interior cross-section W1 of the outlet opening 9 are smaller than the cross-section of the passage opening 4, so that a surrounding gap 15 is formed between the edge 5 and the tail pipe orifice 7. Since, in a preferred embodiment, the tail pipe orifice 7 is constructed as a double-walled pipe with an interior pipe wall 13 and an exterior pipe wall 14, the gap 15 exists between the exterior pipe wall 14 and the mouth edge 5.

The interior cross-section or the opening width W2 of the inlet opening 8 is larger than the exterior cross-section W3 of the tail pipe 3. During the drive of the motor vehicle, a first cooling air flow KS can be introduced into the orifice 7 in this manner, which cooling air flow KS can mix in the orifice 7 with the exhaust gas flow AS flowing in the direction of the arrow 6 and cool the orifice 7, particularly the interior pipe wall 13. FIG. 1 illustrates that the air inlet section 10 with its inlet opening 8 reaches slightly over the tail pipe 3, so that the exhaust gas flow AS is introduced securely into the orifice and—as a result of the larger interior opening width W2—is situated at a radial distance RA from the circumferential wall 16 of the tail pipe 3. In the embodiment, the interior pipe wall 13 has this radial distance RA from the circumferential wall 16 in the area of the air inlet section 10. The passage cross-section, thus the interior cross-section of the air inlet section 10 and of the transition section 11 as well as of the outlet section 12 of the tail pipe orifice 7, along the entire length LG of the tail pipe orifice 7 is larger than the exterior cross-section W3 of the tail pipe 3. Thus, the tail pipe orifice 7 can be pushed almost completely over the tail pipe 3 when, in the event of a rear impact, the rear covering part 1 with the tail pipe orifice 7 fastened thereto is deformed or displaced in the driving direction FR. In this case, the tail pipe orifice 7 does not act upon the tail pipe 3 or acts only slightly upon the tail pipe 3, so that a relevant damage to the tail pipe 3 and thus possibly also to other parts of the exhaust system is at least reduced, whereby the guiding of the exhaust gas within the exhaust system is not or is hardly impaired. In addition to the thermal uncoupling between the tail pipe 3 and the orifice 7, a mechanical uncoupling also exists by means of the wide passage cross-section of the orifice 7.

In order to further reduce the heat transmission from the tail pipe orifice 7 especially made of metal to the rear covering part 1, it is provided to construct the double-walled pipe with its interior pipe wall 13 and exterior pipe wall 14 so that air can flow through it. In particular, air inlets 18 are provided for this purpose on the forward face 17 of the tail pipe orifice 7, which air inlets 18 permit a second or interior cooling air flow 19 into the hollow jacket 20 of the pipe.

Cooling air outlets 21' can be made on the rearward face 21 or in the jacket 20, so that the air flow 19 can exit. This air flow 19 causes a heat insulation of the interior pipe wall 13 with respect to the exterior pipe wall 14 as well as removal of the heat.

The tail pipe orifice 7 is fastened by means of fastening devices 22 on the rear covering part 1. The fastening device can comprise one or more strip-shaped fastening lugs 23 which are fastened with one end to the exterior pipe wall 14 and with the other end to the rear covering part 1, for example, by means of a heat-resistant fastening frame 24. The lugs 23 can be arranged to be distributed around the circumference of the orifice 7 and result in a low heat transmission from the orifice 7 to the rear covering part 1. The fastening frame 24, which is preferably made of a plastic material and, as required, has a fiber reinforcement, causes a further thermal uncoupling of the tail pipe orifice 7 from the rear covering part 1. For a low heat transmission or an increase of the temperature lag from the orifice 7 to the rear covering part 1, the fastening lugs 23 may have a diminished cross-section, for example, in the form of a breakthrough 25 or a constriction. The breakthrough 25 can be shaped by a punching or bending-out of the material of the lug 23, in which case, the bent-out material can form an air guiding lug 25'. In the illustrated embodiment, the fastening lugs 23 are bent in a U-shape, and one leg 26 is fastened to the tail pipe orifice 7, and the other leg 27 is fastened to the rear covering part 1 by way of the fastening frame 24. The fastening lugs may also be bent in an L-shape and may correspondingly be connected with the fastening frame 24. The diminishing of the cross-section, thus the breakthrough 25 or the constriction may be constructed on the base 28 connecting the two legs 26 and 27. Since the fastening device 22 is not constructed as a surrounding ring but comprises the strip-shaped lugs 23, a third cooling-air flow 29 is permitted along the exterior pipe wall 14 which exits again at the rear covering part 1 in the gap 15, which gap 15 therefore forms an air outlet opening 30 between the orifice 7 and the edge 5 of the mouth. The lugs 23 can deflect the third cooling flow 29 in the direction of the gap 15. This can be achieved particularly by means of the air guiding lugs 25' bent out of the breakthroughs 25. For a covering of the gap 15, a ring-shaped covering 31 is inserted into the air outlet opening 30, which covering 31 extends approximately transversely to the third cooling air flow 29 and may be situated by means of its free end at a distance from the jacket 20. Thus, the cooling air flow 29 can flow around the covering 31. As an alternative or in addition, one or more breakthroughs 32 can be made in the covering 31 through which the third air flow 29 can pass. The covering 31 is constructed, for example, as a perforated plate. The covering 31 is fastened to the rear covering part 1 or to the fastening frame 24 or to the orifice 7 or to a shielding orifice 34. For this fastening, the covering 31 is equipped with a detent connection 33 having a detent nose 33', which detent connection 33 is mounted on the covering 31, for example, on the shielding orifice 34 and reaches behind the rear covering part 1 or the fastening frame 24. At its end situated at the mouth edge 5, the shielding orifice 34 is constructed to be projecting toward the outside, so that it reaches around the mouth edge 5 and, together with the catch 33, forms the fastening of the covering 31 and of the fastening frame 24 on the rear covering part 1. The shielding orifice 34 and the covering 31, from a thermal point of view, are preferably made of metal, for example, aluminum, and, if required, are connected with one another or produced in one piece. They may also consist of a plastic material, if required, having a fiber reinforcement. Both parts may be painted. The covering can also be constructed as a web bent-away from the shielding orifice 34.

Figure 2:
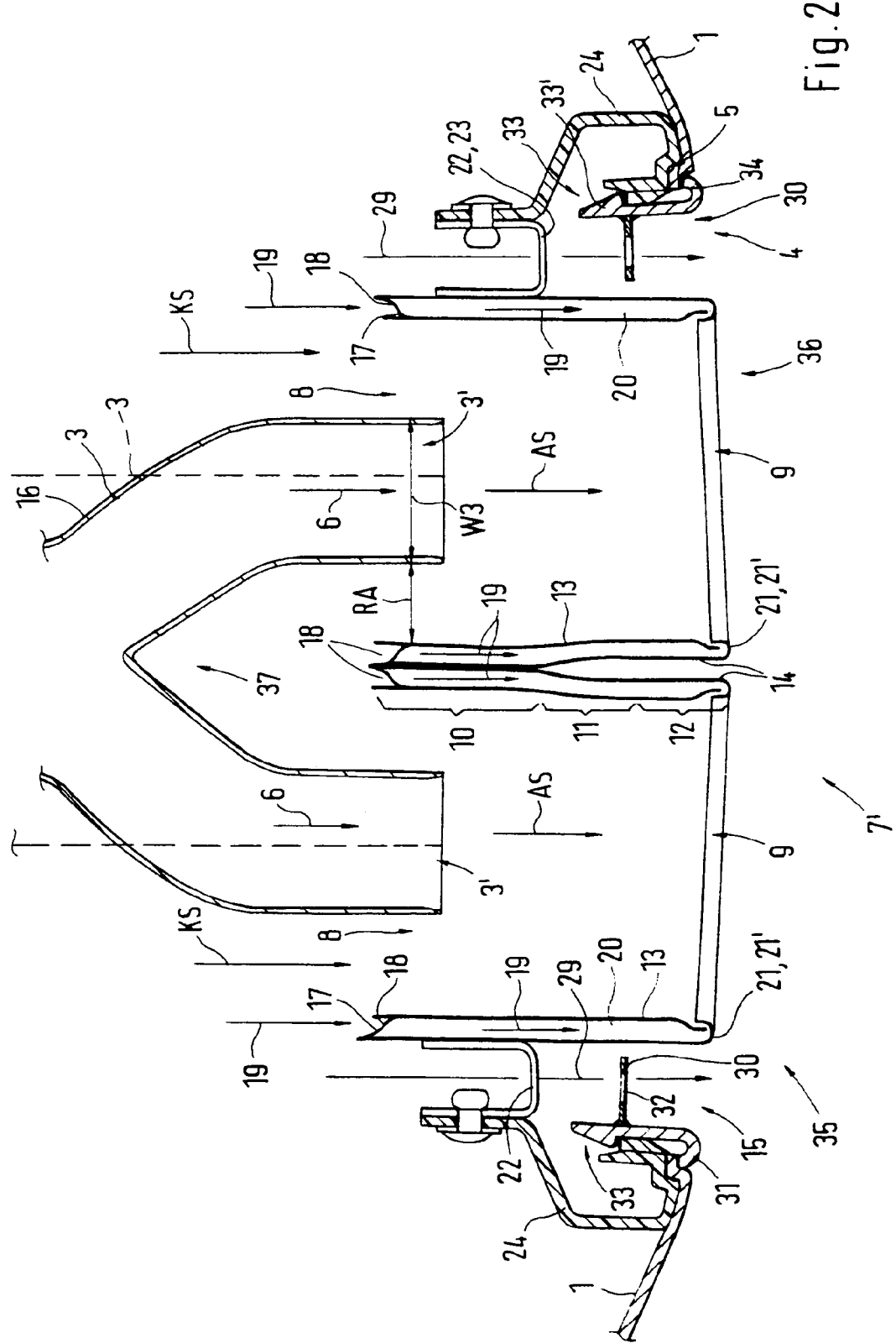
FIG. 2, is a sectional view with the sectional plane extends parallel to an imaginary horizontal line.

FIG. 2 illustrates that a tail pipe orifice 7' in a second embodiment is constructed as a double tail pipe orifice with two pipe sections 35 and 36, each of which being assumed to be an orifice 7 according to FIG. 1 and, in the illustrated embodiment, cohesively forming constructional unit. The two pipe sections 35 and 36 are situated adjacently—as illustrated—side-by-side or above one another and are preferably fastened to one another. For this purpose, the exterior pipe walls 14 of the pipe sections 35 and 36 can be connected with one another at least in sections. The tail pipe orifice 7' is fastened to the rear covering part 1 and, for example, each pipe section 35 and 36 has the fastening device 22. One or more passage openings 4 for the orifice 7' can be worked out of the rear covering part 1. Also, in FIG. 2, identical or identically acting parts as in FIG. 1 are provided with the same reference numbers. To this extent, reference is made to their description.

When a double pipe orifice—as illustrated in FIG. 2—is provided, the tail pipe 3 of the exhaust system can be equipped, for example, with a Y-shaped or fork-type widening 37, so that one tail pipe 3 ends in each pipe section 35 and 36 respectively of the orifice 7'. Instead of the fork-type widening 37, two separate tail pipes 3 can also project into the respective pipe sections 35 and 36 respectively. A center or central arrangement of each tail pipe 3 is also possible and is illustrated by a broken line in FIG. 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rear covering part of a motor vehicle having a tail pipe orifice fastened to said rear covering part for an exhaust system of said motor vehicle, having a bordered passage opening for the tail pipe orifice, the tail pipe orifice comprising
an air inlet section including an inlet opening which communicates in a non-contacting manner with a tail pipe of the exhaust system and extends over the tail pipe, said inlet opening situated at a radial distance from said tail pipe, whereby heat transfer is minimized between said tail pipe and said tail pipe orifice,
an outlet opening situated downstream with respect to the inlet opening,
a transition section situated between the inlet opening and the outlet opening and tapering in its cross-section, and
an interior cross-section of the inlet opening which is larger than the exterior cross-section of the tail pipe,
wherein a passage cross-section along the entire length of the tail pipe orifice is larger than an exterior cross-section of the tail pipe of the exhaust system;
wherein the tail pipe orifice is constructed as a double-walled pipe with a jacket for air can flow; and
wherein the tail pipe orifice is fastened by several strip-shaped fastening lugs originating from an exterior pipe wall of the double-walled pipe to the rear covering part, by way of a fastening frame.

2. The rear covering part according to claim 1, further including
a second air outlet opening provided between the tail pipe orifice and the rear covering part.

3. The rear covering part according to claim 2, further including
a covering, having at least one breakthrough, arranged in the second air outlet opening.

4. The rear covering part according to claim 3,
wherein the covering is fixed on at least one of the rear covering part and a fastening frame.

5. The rear covering part according to claim 3, wherein the covering has a frame which surrounds the tail pipe orifice and which is used for the fastening of the covering to the rear covering part and reaches over the mouth edge of the passage opening as a shielding orifice.

6. The rear covering part according to claim 3, wherein said covering part is at least one of made of a plastic material and is painted and coated.

7. The rear covering part according to claim 1, wherein the fastening lugs have a U-shaped or L-shaped construction and in that one leg is linked to the tail pipe orifice and the other leg is linked to the rear covering part or to the fastening frame.

8. The rear covering part according to claim 7, wherein the fastening lugs have a diminished cross-section which presents an increased resistance to the heat conduction.

9. The rear covering part according to claim 1, wherein the fastening lugs have a diminished cross-section which presents an increased resistance to the heat conduction.

10. The rear covering part according to claim 1, wherein the tail pipe orifice is constructed as a double tail pipe orifice and two pipe sections are arranged side-by-side or above one another.

11. A tail pipe orifice structure for a motor vehicle exhaust system, comprising:
an air inlet section including an inlet opening with an interior cross-section larger than an exterior cross-section of a tail pipe of said motor vehicle;

an outlet opening positioned downstream from said inlet opening;

a transition section situated between said inlet opening and said outlet opening and having a tapered cross-section;

wherein a passage cross-section along an entire length of the tail pipe orifice structure is larger than an exterior cross-section of the tail pipe, and wherein the tail pipe orifice structure is fastened by a plurality of strip-shaped fastening lugs extending from an exterior pipe wall of the double-walled pipe to a rear covering part;

whereby the entirety of said air inlet section is spaced apart from said tail pipe in a non-contacting manner, in order to minimize heat transfer from said tail pipe to said air inlet section.

12. The structure according to claim 11, wherein said inlet opening communicates with the tail pipe, extends over the tail pipe and is situated at a radial distance from said tail pipe.

13. The structure according to claim 11, wherein the tail pipe orifice structure is constructed as a double-walled pipe with a jacket for air flow.

14. The structure according to claim 11, further including a second air inlet opening.

15. The structure according to claim 14, wherein the covering is fixed on at least one of a rear covering part and a fastening frame.

16. The structure according to claim 11, further including covering having at least one breakthrough arranged in the second air inlet opening.

17. The structure according to claim 11, constructed as a double tail pipe orifice and two pipes section arranged side-by-side or above one another.

* * * * *